Oct. 8, 1957 R. M. HARRIS 2,808,959
MILK CAN COVER
Filed Oct. 17, 1955

INVENTOR.
RALPH M. HARRIS
BY
Townsend, Townsend and Hoppe
ATTORNEYS

United States Patent Office 2,808,959
Patented Oct. 8, 1957

2,808,959
MILK CAN COVER
Ralph M. Harris, Corning, Calif.

Application October 17, 1955, Serial No. 540,893

3 Claims. (Cl. 220—55)

This invention relates to a new and improved closure for milk cans and the like.

In the dairy industry it is customary to transport milk from place to place in 5 gallon cans. Such cans in the industry commonly have a rather standardized form consisting of a relatively large flared neck to facilitate the filling and emptying of fluid from the container.

One principal object of this invention is to provide a new and improved cover or lid for such cans having two locking mechanisms disposed on opposite sides of the lid to lock the lid in place with respect to the can, and including lever arms to actuate the locking mechanism which swing downwardly in a depression or recess in the lid when in a locked condition. By this arrangement, after the contents of a can have been examined by a milk inspector, the lever arms can be joined together by milk inspector's tags or seals so that the can cannot be opened or the contents removed without the breaking of the seal. The inspector's seal in this case is wholly within the confines of the depression or recess in the lid and therefore is protected against accidental damage in normal handling of the can in transit.

A further object of the invention is to provide a milk can lid which nests within the flared neck of a milk can, the lid having a gasketed flange for milk sealing contact with the beaded mouth of the milk can, and which is further provided with a toggle joint actuated mechanism for hooking engagement with the can to provide a tight closure.

A still further object of the invention is to provide a lid of the character briefly mentioned above and in which the toggle joint mechanism includes a lever arm hinged to the lid so that it is enabled to swing into the protective confines of a saucer-like cavity or recess of the lid when the mechanism is actuated to lock the lid to the can.

A further object is to provide a toggle joint mechanism of novel construction.

Other objects of the present invention will become apparent upon reading the following specification and referring to the accompanying drawings in which similar characters of reference represent corresponding parts in each of the several views.

Figure 1:
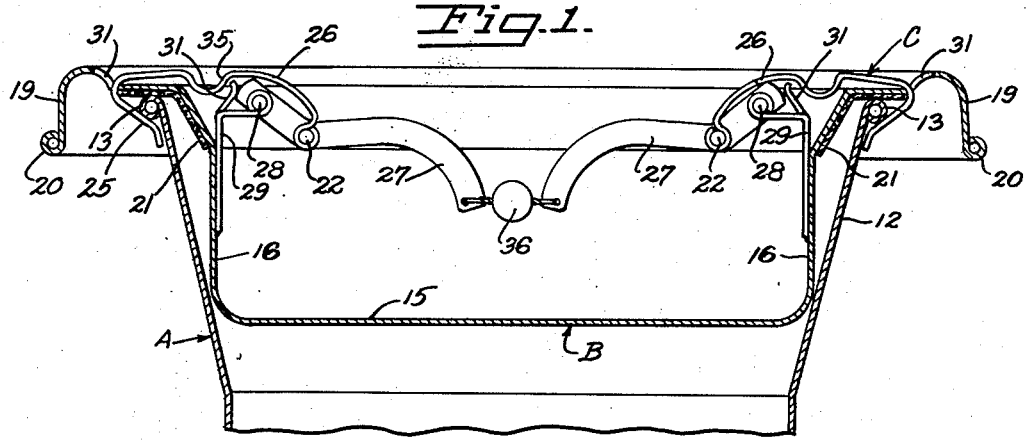
Fig. 1 is a side sectional view of one embodiment of the closure shown nested in the neck region of a milk can with the lid locking mechanism in a locked condition.
Figure 2:
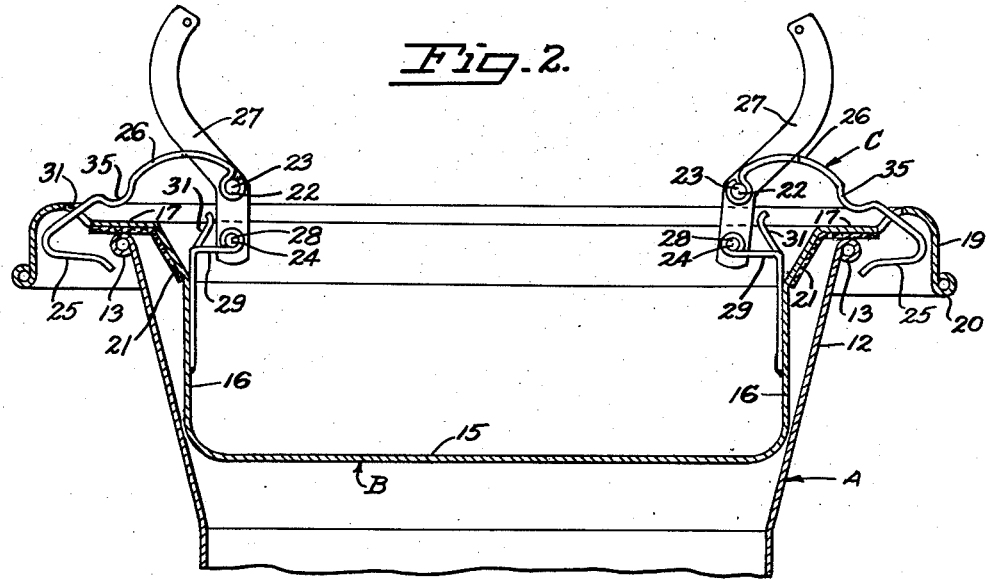
Fig. 2 is a similar view to Fig. 1 with the locking mechanism shown in the unlocked condition.
Figure 3:
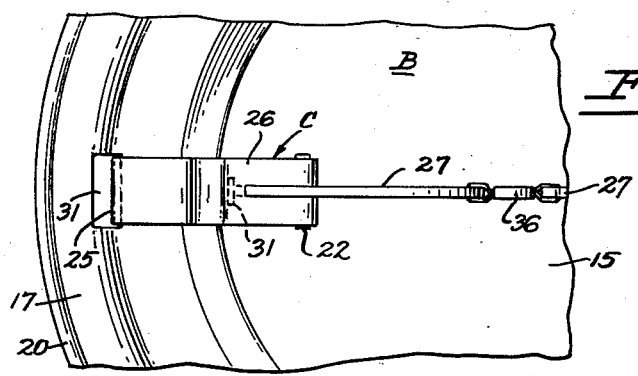
Fig. 3 is a top plan view of the view of Fig. 1.

Referring to Figs. 1 and 2, the neck and mouth of a milk can representative of those commonly used in the milk industry and generally indicated at A, is provided with a frusto-conical neck region 12 which terminates in an annular, outwardly folded-over bead 13 to form an open-rimmed mouth for the container. A lid, generally indicated at B, is formed with a concave, recessed body portion proportioned to fit or nest in the neck region of the container.

The body portion of lid B is defined by a bottom plate 15 and a cylindrical side 16 which flanges outwardly from the top into a horizontal peripheral flange 17. From flange member 17 an annular inverted trough 19 is formed around the lid to define a convenient handle or gripping area for handling the lid. The end of the trough 19 is folded over upwardly to form a bead 20. The mouth of can A and lid B are held in a liquid seal contact by an annular gasket 21 interposed between the underside of the flange 17 and bead 13 of the can when the lid is nested in the can, as shown in Figs. 1 and 2.

Two locking mechanisms, generally indicated at C, are provided inwardly of and adjacent opposed sides 16 of lid B to lock the lid to the mouth of the can. More specifically, each latching mechanism C is provided with a hook 25 which is connected by a resilient member 26 to a lever arm 27 at a pivot point 23 by a pin 22. Lever arm 27, in turn, is hinged from a pivot point 24 by a pin 28 rotatably held by a bracket 29 attached to wall 16. An opening 31 is provided in trough or handle 19 to accommodate the passage therethrough of hook 25 and member 26 so that the hook is enabled to hook onto a portion of bead 13 and rim 17 and hold them together.

When each latch mechanism C is in an open condition, as illustrated in Fig. 2, arm 27 is in an upward or vertical condition with respect to lid B. In this condition pivot point 23 is sufficiently close to flange 17 and bead 13 so that hook 25 is unable to forcefully engage the pin and bead together. Therefore with lever arm 27 in the upper condition and hook 25 freed from engagement with flange 17 and bead 13, cover B is readily removable from container A.

When arm 27 is depressed downwardly (see Fig. 1), it swings down into the central recessed area of lid B defined by bottom plate 15 and side 16. Pivot point 23 swings with arm 27 in an arc about pivot point 24 and in so doing hook 25 is drawn toward or against bead 13. Member 26 is provided with a soft bend or fold 35 of sufficient resiliency to allow member 26 to yieldably elongate to accommodate the maximum distance between pivot point 23 and hook 25 when engaged with rim 17. At the downward position of arm 27, the axis of hook 25 and pivot point 23 is below pivot point 24 and the distance between hook 25 and pivot point 23 is less than maximum so that a toggle joint lock arrangement is effected which resists upward movement of arm 27 due to the resilient forces from member 26 when the arm is moved through the maximum arc distance between hook 25 and pivot point 23.

The rear end of arm 27 is provided with a surface radial to pivot point 24 which interacts with a spring 31 mounted to bracket 29 so the spring biases pin 28 against bracket 29 to prevent free movement of the lever arm when in the lower position.

When both lock mechanisms C are in the locked or downward position, hooks 25 exert a clamping action or pressure against bead 13 and flange 17 to hold lid B in locked engagement to container A. If one arm 27 is raised to disengage its hook 25, it is then possible to raise one side of lid B for convenience of permitting gases to exhaust from the can without completely removing the lid. This permits maintenance of a smaller and better controlled opening through which dirt could otherwise have access to container A.

With both lock mechanisms C in the locked condition, a milk inspector's seal 36 can be fastened between the two opposed arms 27. By this device it is impossible to remove lid B from container A without first breaking seal 36. An important advantage of the construction is that because seal 36 is depressed within the protective confines of the recessed area of the lid, the same is protected against accidental breakage or rupture in normal handling and stacking operations.

Although the foregoing invention has been described in some detail by way of illustration and example for purposes of clarity of understanding, it is understood that certain changes and modifications may be practiced within the spirit of the invention and scope of the appended claims.

What is claimed is:

1. A closure for the open rimmed mouth of a container comprising a dish-shaped lid defining a concave recessed body portion positioned to nest within the neck region of the container; a peripheral flange extending outward from the body portion of the lid for overlying seating engagement with the rimmed mouth of the container; said peripheral flange formed with oppositely disposed openings adjacent and slightly outward of the periphery of said rim mouth; a pair of toggle mechanisms mounted within the recessed portion of said lid; each said toggle mechanism having a hooklike rim-engaging member operably connected to said toggle mechanism; each hooklike member extending through said opening in said peripheral flange of said lid with the outer end of each member releasably engageable with the rimmed mouth opening of the container; each toggle mechanism including a lever hinged to said recessed body portion; each toggle mechanism including means interconnecting each said lever with an associated member; each lever swingable from a first position extending above the plane of the recess whereat said connecting means is operated to move said member out of clamping engagement with said rimmed mouth opening to a said second position wholly within the confines of the recessed body whereat said connecting means is operated to pull said member into engagement with said rimmed mouth of said container.

2. The combination of claim 1 and wherein each said hooklike member is formed with a soft bend to permit each member to yieldably elongate under tension exerted by each said toggle mechanism when a said lever is moved to its second position with the outer end of an associated hooklike member releasably engaged with said rim mouth.

3. The combination of claim 1 and wherein the outer end of each said hooklike member when releasably engaged with said rim mouth is disposed below and inwardly of the outer perimeter of said peripheral flange of said lid.

References Cited in the file of this patent

UNITED STATES PATENTS

| 977,491 | Vigdal | Dec. 6, 1910 |
| 1,027,021 | Werner | May 21, 1912 |
| 1,484,062 | Conner | Feb. 19, 1924 |
| 1,603,418 | Scheider | Oct. 19, 1926 |

FOREIGN PATENTS

| 27,973 | Great Britain | of 1906 |
| 1,030,439 | France | Mar. 11, 1953 |